United States Patent
Miyamoto

(10) Patent No.: US 11,239,624 B2
(45) Date of Patent: Feb. 1, 2022

(54) LASER DEVICE AND LINE NARROW OPTICS

(71) Applicant: Gigaphoton Inc., Tochigi (JP)

(72) Inventor: Hirotaka Miyamoto, Oyama (JP)

(73) Assignee: Gigaphoton Inc., Tochigi (JP)

( * ) Notice: Subject to any disclaimer, the term of this patent is extended or adjusted under 35 U.S.C. 154(b) by 185 days.

(21) Appl. No.: 16/827,562

(22) Filed: Mar. 23, 2020

(65) Prior Publication Data

US 2020/0227878 A1 Jul. 16, 2020

Related U.S. Application Data

(63) Continuation of application No. 15/782,965, filed on Oct. 13, 2017, now Pat. No. 10,637,203, which is a
(Continued)

(30) Foreign Application Priority Data

May 28, 2015 (WO) .................. PCT/JP2015/065358

(51) Int. Cl.
*G02B 27/09* (2006.01)
*H01S 3/00* (2006.01)
(Continued)

(52) U.S. Cl.
CPC ............ *H01S 3/005* (2013.01); *G02B 7/1805* (2013.01); *G02B 17/004* (2013.01);
(Continued)

(58) Field of Classification Search
CPC .. G02B 17/004; G02B 27/28; G02B 27/0927; G02B 27/0972; G02B 27/0944;
(Continued)

(56) References Cited

U.S. PATENT DOCUMENTS 6,577,665 B2 6/2003 Vogler et al.
7,277,466 B2 10/2007 Partlo et al.
(Continued)

FOREIGN PATENT DOCUMENTS

CN 1558293 A 12/2004
CN 1700416 A 11/2005
(Continued)

OTHER PUBLICATIONS

An Office Action mailed by China National Intellectual Property Administration dated Jan. 13, 2021, which corresponds to Chinese Patent Application No. 201910767894.X and is related to U.S. Appl. No. 16/827,562 with English language translation.
(Continued)

*Primary Examiner* — Mustak Choudhury
(74) *Attorney, Agent, or Firm* — Studebaker & Brackett PC

(57) ABSTRACT

A laser device may include a chamber accommodating a pair of discharge electrodes, a grating provided outside the chamber, first beam-expanding optics provided between the chamber and the grating and configured to expand a beam width of light outputted from the chamber at least in a first direction perpendicular to a direction of discharge between the pair of discharge electrodes, and second beam-expanding optics having a plurality of prisms provided between the chamber and the grating, the second beam-expanding optics being configured to expand a beam width of light outputted from the chamber at least in a second direction parallel to the direction of discharge between the pair of discharge electrodes.

6 Claims, 11 Drawing Sheets

Related U.S. Application Data continuation of application No. PCT/JP2016/060883, filed on Apr. 1, 2016.

(51) Int. Cl.

| | | |
|---|---|---|
| *H01S 3/1055* | (2006.01) | |
| *G02B 7/18* | (2021.01) | |
| *G02B 17/00* | (2006.01) | |
| *G02B 27/28* | (2006.01) | |
| *H01S 3/225* | (2006.01) | |
| *H01S 3/02* | (2006.01) | |
| *H01S 3/08* | (2006.01) | |
| *H01S 3/038* | (2006.01) | |

(52) U.S. Cl.
CPC ..... *G02B 27/0944* (2013.01); *G02B 27/0972* (2013.01); *G02B 27/28* (2013.01); *H01S 3/1055* (2013.01); *H01S 3/225* (2013.01); *H01S 3/02* (2013.01); *H01S 3/038* (2013.01); *H01S 3/08004* (2013.01)

(58) Field of Classification Search
CPC .... G02B 5/1814; G02B 5/1838; G02B 7/008; G02B 7/0025; G02B 7/1805; G02B 7/70025; G02B 7/70041; G02B 7/70183; G02B 7/70483; G02B 7/70575; H01S 3/005; H01S 3/02; H01S 3/04; H01S 3/08; H01S 3/027; H01S 3/036; H01S 3/038; H01S 3/097; H01S 3/10; H01S 3/13; H01S 3/14; H01S 3/22; H01S 3/105; H01S 3/106; H01S 3/134; H01S 3/139; H01S 3/225; H01S 3/1055; H01S 3/2251; H01S 3/2258; H01S 3/0315; H01S 3/08009; H01S 3/094084; H01S 3/09415; H01S 3/091; H01S 3/08036; H01S 3/0401; H01S 3/08004; H01S 5/142; H01S 5/0654
See application file for complete search history.

(56) References Cited

U.S. PATENT DOCUMENTS

| | | | |
|---|---|---|---|
| 7,653,112 B2 | 1/2010 | Gillespie et al. | |
| 2001/0014110 A1* | 8/2001 | Partlo | H01S 3/10 372/100 |
| 2003/0041971 A1 | 3/2003 | Kido et al. | |
| 2005/0100072 A1 | 5/2005 | Rao et al. | |
| 2005/0255413 A1 | 11/2005 | Endo et al. | |
| 2011/0164635 A1* | 7/2011 | Takada | H01S 3/13 372/38.01 |
| 2013/0208744 A1* | 8/2013 | Kumazaki | H01S 3/08036 372/34 |
| 2015/0139263 A1 | 5/2015 | Sutter et al. | |

FOREIGN PATENT DOCUMENTS

| | | |
|---|---|---|
| CN | 102983485 A | 3/2013 |
| JP | H03-139893 A | 6/1991 |
| JP | H03-250777 A | 11/1991 |
| JP | H05-152666 A | 6/1993 |
| JP | H05-167172 A | 7/1993 |
| JP | H11-330592 A | 11/1999 |
| JP | 2003-518757 A | 6/2003 |
| JP | 2004-140265 A | 5/2004 |
| JP | 2006-165484 A | 6/2006 |
| JP | 5152666 B2 | 2/2013 |
| JP | 2013-168473 A | 8/2013 |

OTHER PUBLICATIONS

International Search Report issued in PCT/JP2015/065358; dated Jul. 21, 2015.
International Preliminary Report on Patentability issued in PCT/JP2015/065358; dated Nov. 28, 2017.
International Search Report issued in PCT/JP2016/060883; dated Jun. 21, 2016.
International Preliminary Reporton Patentability issued in PCT/JP2016/060883; dated Nov. 28, 2017.
An Office Action mailed by the State Intellectual Property Office of the People's Republic of China dated Apr. 16, 2019, which corresponds to Chinese Patent Application No. 201680022711.6 and is related to U.S. Appl. No. 15/782,965; with English translation.
An Office Action mailed by the Chinese Patent Office dated Nov. 6, 2019, which corresponds to Chinese Patent Application No. 201680022711.6 and is related to U.S. Appl. No. 15/782,965.

\* cited by examiner

LASER DEVICE AND LINE NARROW OPTICS

CROSS-REFERENCE TO RELATED APPLICATIONS

This application is a Continuation of U.S. patent application Ser. No. 15/782,965 filed Oct. 13, 2017, which is a Continuation of International Application No. PCT/JP2016/060883 filed Apr. 1, 2016, which claims benefit of priority to International Application No. PCT/JP2015/065358 filed May 28, 2015, the entire content of which is incorporated herein by reference.

TECHNICAL FIELD

The present disclosure relates to a laser device and line narrow optics.

BACKGROUND ART

The recent miniaturization and increased levels of integration of semiconductor integrated circuits have led to a demand for increases in the resolutions of semiconductor exposure devices. A semiconductor exposure device is hereinafter referred to simply as "exposure device". Accordingly, exposure light sources to output light at shorter wavelengths have been under development. As the exposure light sources, gas laser apparatuses instead of conventional mercury lamps are typically used. The gas laser apparatuses for exposure include a KrF excimer laser apparatus that outputs an ultraviolet laser beam at a wavelength of 248 nm and an ArF excimer laser apparatus that outputs an ultraviolet laser beam at a wavelength of 193 nm.

As a current exposure technology, immersion exposure has been put into practical use. In the immersion exposure, a gap between an exposure lens and a wafer in an exposure apparatus is filled with fluid such as water to change refractive index in the gap, such that an apparent wavelength of the light from the exposure light source is shortened. In a case where immersion exposure is performed using an ArF excimer laser apparatus as an exposure light source, a wafer is irradiated with ultraviolet light whose wavelength in water is equivalent to 134 nm. This technology is referred to as "ArF immersion exposure". The ArF immersion exposure is also referred to as "ArF immersion lithography".

Spectrum line widths of KrF and ArF excimer laser apparatuses in natural oscillation are as wide as approximately 350 pm to 400 pm. This causes a chromatic aberration of a laser beam (ultraviolet light) that is subjected to reduced projection onto a wafer by a projection lens in an exposure device. The chromatic aberration thus causes reduction in resolving power. Therefore, a spectrum line width of a laser beam that is outputted from a gas laser apparatus needs to be narrowed to such an extent that the chromatic aberration can be ignored. The spectrum line width is also referred to as "spectrum width". To narrow the spectrum width, a laser resonator of a gas laser apparatus is equipped with a line narrow module having a line narrow element. The line narrow element may be an etalon, a grating, or the like. A laser apparatus whose spectrum width is narrowed in this way is referred to as "line narrowed laser apparatus".

Patent Document 1: Japanese Patent Application Publication No. H11-330592 A
Patent Document 2: Japanese Patent Application Publication No. H03-139893 A
Patent Document 3: U.S. Pat. No. 7,653,112 B
Patent Document 4: U.S. Pat. No. 7,277,466 B
Patent Document 5: United States Patent Application Publication No. 2001/0014110 A
Patent Document 6: Japanese Patent Application Publication No. H05-152666 A
Patent Document 7: Japanese Patent Application Publication No. 2004-140265 A
Patent Document 8: Japanese Patent Application Publication No. 2006-165484 A
Patent Document 9: Japanese Patent Application Publication No. H03-250777 A

SUMMARY

An aspect of the present disclosure may be related to a laser device including: a chamber accommodating a pair of discharge electrodes; a grating provided outside the chamber; first beam-expanding optics provided between the chamber and the grating and configured to expand a beam width of light outputted from the chamber at least in a first direction perpendicular to a direction of discharge between the pair of discharge electrodes; and second beam-expanding optics having a plurality of prisms provided between the chamber and the grating, the second beam-expanding optics being configured to expand a beam width of light outputted from the chamber at least in a second direction parallel to the direction of discharge between the pair of discharge electrodes.

Another aspect of the present disclosure may be related to line narrow optics used with a chamber accommodating a pair of discharge electrodes, the line narrow optics including: a grating provided outside the chamber; first beam-expanding optics provided between the chamber and the grating and configured to expand a beam width of light outputted from the chamber at least in a first direction perpendicular to a direction of discharge between the pair of discharge electrodes; and second beam-expanding optics having a plurality of prisms provided between the chamber and the grating, the second beam-expanding optics being configured to expand a beam width of light outputted from the chamber at least in a second direction parallel to the direction of discharge between the pair of discharge electrodes.

BRIEF DESCRIPTION OF DRAWINGS

Exemplary embodiments of the present disclosure will be described below as mere examples with reference to the appended drawings.

DESCRIPTION OF EMBODIMENTS

<Contents>
1. Outline
2. Laser Device Including Line Narrow Module
   2.1 Configuration
      2.1.1 Laser Chamber
      2.1.2 Line Narrow Module
      2.1.3 Output Coupling Mirror
   2.2 Operation
   2.3 Problem
3. Laser Device Including Second Beam-Expanding Optics Expanding Beam in Direction Substantially Parallel to Direction of Discharge
   3.1 Configuration
   3.2 Effect
4. Variation of Second Beam-Expanding Optics
   4.1 Combination of Cylindrical Concave Lens and Cylindrical Convex Lens
   4.2 Prisms
   4.3 Combination of Spherical Concave Lens and Spherical Convex Lens
5. Supporting Structure for Second Beam-Expanding Optics
   5.1 First Example
   5.2 Second Example
   5.3 Configuration of Supporting Unit
6. Others Embodiments of the present disclosure will be described in detail below with reference to the drawings. The embodiments described below indicate several examples of the present disclosure, and may not intend to limit the content of the present disclosure. Not all of the configurations and operations described in the embodiments are indispensable in the present disclosure. Identical reference symbols may be assigned to identical constituent elements and redundant descriptions thereof may be omitted.

1. Outline

A laser device may include a chamber and a line narrow module. The chamber may accommodate a pair of discharge electrodes. The line narrow module may be provided outside the chamber. The line narrow module may include a grating and a plurality of prisms. The prisms may constitute first beam-expanding optics. The prisms may be provided between the chamber and the grating. The prisms may expand a beam, outputted from the chamber, in a first direction perpendicular to a direction of discharge between the pair of discharge electrodes, and allow the beam to be incident on the grating.

In one aspect of the present disclosure, second beam-expanding optics including a plurality of prisms may be provided between the chamber and the grating. The second beam-expanding optics may expand the beam, outputted from the chamber, in a second direction parallel to the direction of discharge between the pair of discharge electrodes.

Note that, the word "perpendicular," "parallel," or the like does not intend to represent a strict numerical value of angle but has tolerance in a practically acceptable range.

2. Laser Device Including Line Narrow Module

2.1 Configuration

Figure 1A:
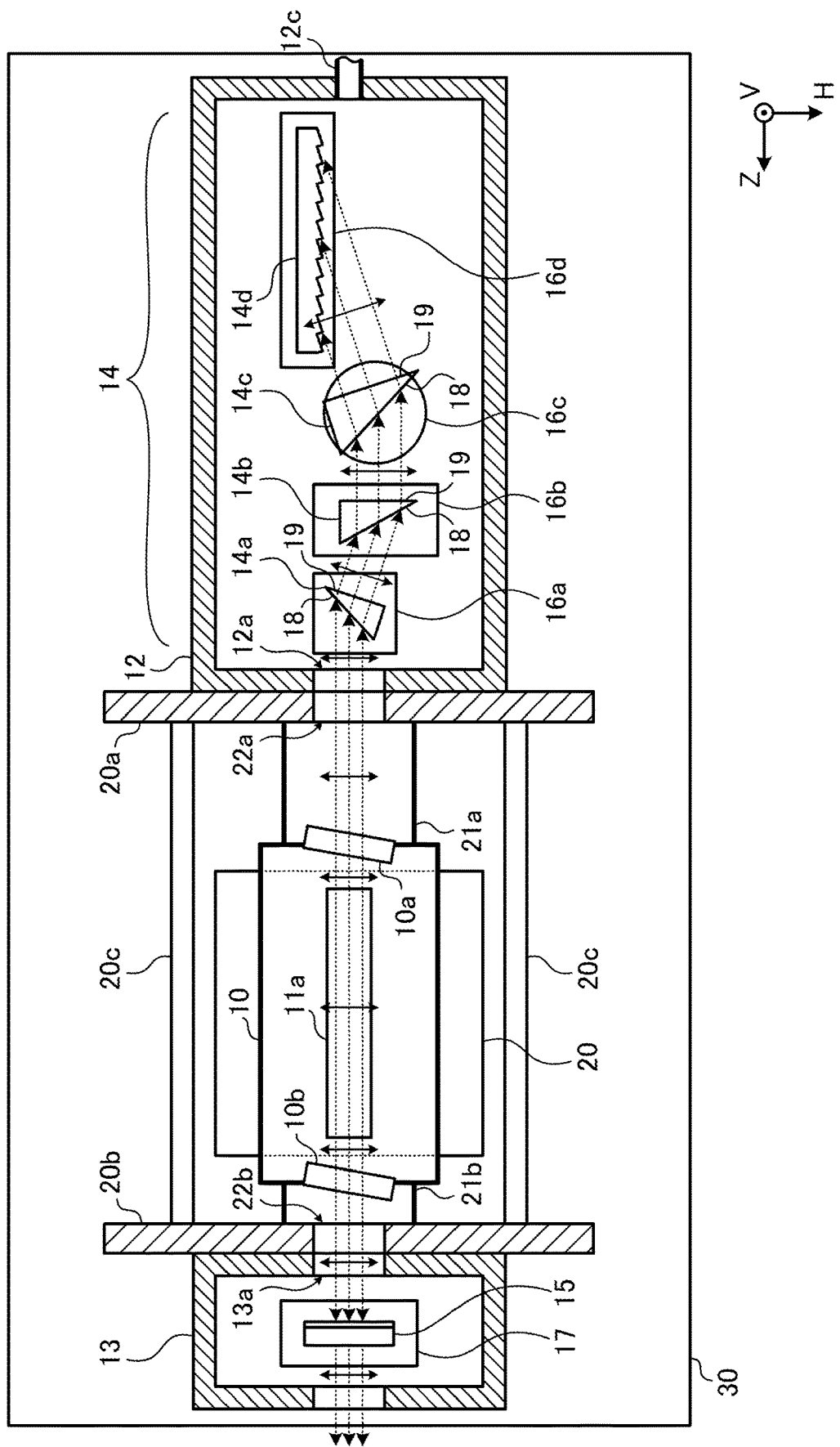
FIG. 1A schematically shows a configuration of a laser device according to a comparative example.
Figure 1B:
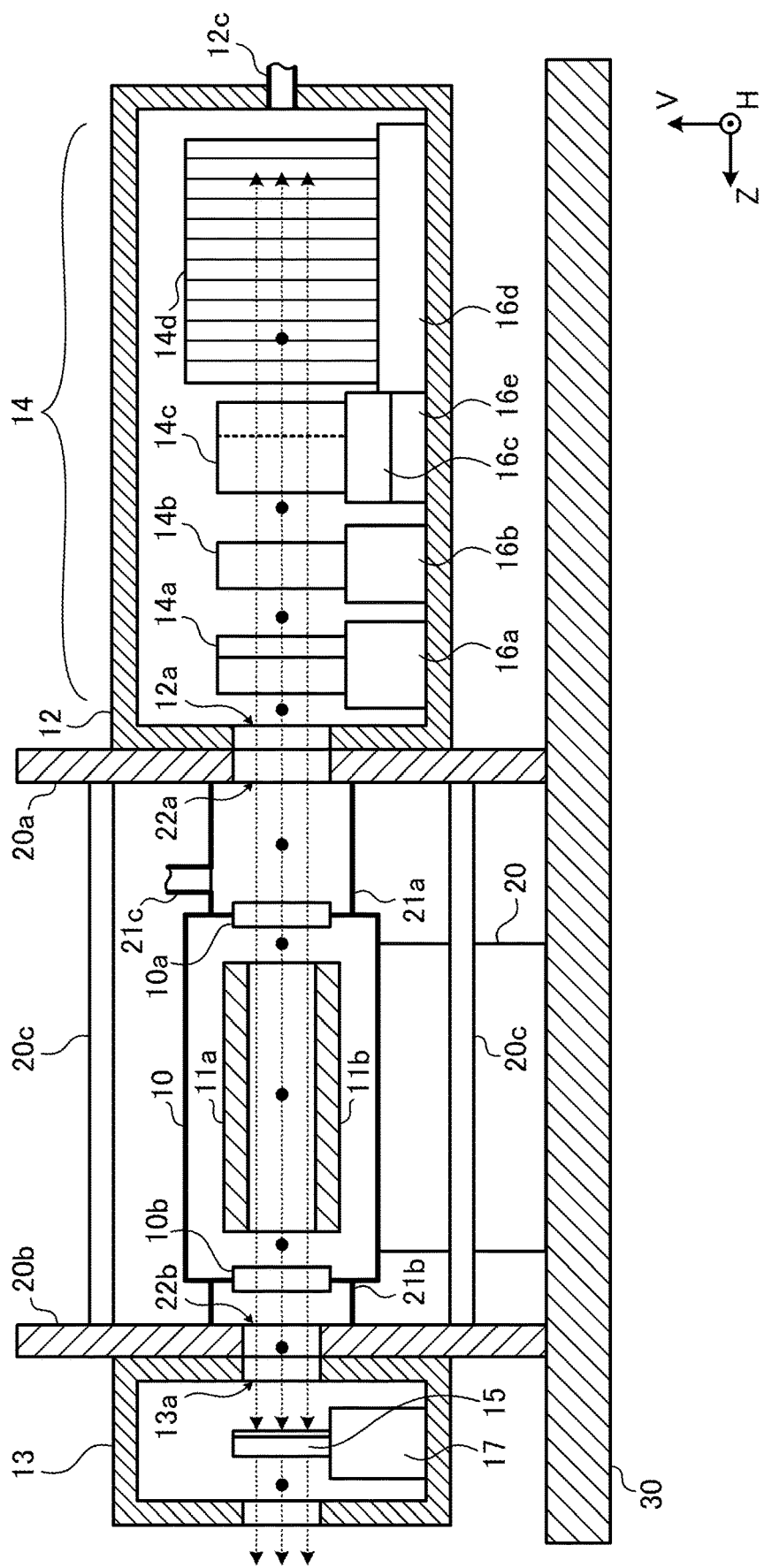
FIG. 1B schematically shows the configuration of the laser device according to the above-described comparative example.

FIGS. 1A and 1B schematically show a configuration of a laser device according to a comparative example. The laser device shown in FIGS. 1A and 1B may include a laser chamber 10, a pair of discharge electrodes 11a and 11b, a line narrow module 14, and an output coupling mirror 15. The line narrow module 14 and the output coupling mirror 15 may constitute an optical resonator. The laser chamber 10 may be provided in an optical path of the optical resonator. The laser device may be a master oscillator that performs laser oscillation to output a seed beam to be incident on an unillustrated amplifier.

FIG. 1A shows an internal configuration of the laser device as viewed in a direction substantially parallel to the direction of discharge between the pair of discharge electrodes 11a and 11b. FIG. 1B shows the internal configuration of the laser device as viewed in a direction substantially perpendicular to the direction of discharge between the pair of discharge electrodes 11a and 11b and substantially perpendicular to the travelling direction of the laser beam outputted from the output coupling mirror 15. The travelling direction of the laser beam outputted from the output coupling mirror 15 may be a Z direction. The direction of discharge between the pair of discharge electrodes 11a and 11b may be a V direction or a −V direction. The direction perpendicular to these directions may be an H direction. The −V direction may be substantially the same as the direction of gravity.

2.1.1 Laser Chamber

The laser chamber 10 may be a chamber to seal a laser gas as a laser medium including, for example, a rare gas such as argon gas or krypton gas, a halogen gas such as fluorine gas, and a buffer gas such as neon gas. Respective ends of the laser chamber 10 may have windows 10a and 10b.

The laser chamber 10 may be supported by a holder 20. The laser chamber 10 and the holder 20 may be provided between a plate 20a and a plate 20b. The plate 20a may be fixed to one end of each of three Invar rods 20c. The plate 20b may be fixed to the other end of each of these Invar rods 20c. These Invar rods 20c may define a distance between the plate 20a and the plate 20b. The plate 20a may correspond to a first plate in the present disclosure. The plate 20b may correspond to a second plate in the present disclosure. The holder 20 and the plate 20b may be fixed to a base 30. The plate 20a may be mounted to the base 30 by an unillustrated linear bush movable in the Z direction.

The plate 20a may have a through-hole 22a and the plate 20b may have a through-hole 22b. An optical path tube 21a may be connected between the plate 20a and the laser chamber 10. One end of the optical path tube 21a may be fixed airtight to a periphery of the through-hole 22a of the plate 20a. The other end of the optical path tube 21a may be fixed airtight to a periphery of the window 10a of the laser chamber 10. An optical path tube 21b may be connected between the plate 20b and the laser chamber 10. One end of the optical path tube 21b may be fixed airtight to a periphery of the through-hole 22b of the plate 20b. The other end of the optical path tube 21b may be fixed airtight to a periphery of the window 10b of the laser chamber 10.

The pair of discharge electrodes 11a and 11b may be provided in the laser chamber 10 as electrodes to excite the laser medium by an electric discharge. A pulsed high voltage from an unillustrated pulse power module may be applied to the pair of discharge electrodes 11a and 11b.

As shown in FIG. 1A, the windows 10a and 10b may be arranged such that the plane of incidence of the beam to each of these windows is substantially parallel to an HZ plane, and that the incident angle of the beam to each of these windows is substantially equal to the Brewster's angle.

2.1.2 Line Narrow Module

The line narrow module 14 may include a plurality of prisms, a grating 14d, holders 16a to 16d, and a housing member 12. The prisms may include three prisms 14a to 14c. Each of the three prisms 14a to 14c may have a slant face 18 and a vertical face 19. The slant face 18 may be coated with a film to suppress reflection of p-polarized light. The vertical face 19 may be coated with a film to suppress reflection of light. The grating 14d may be an echelle grating, having a high reflective material on its surface, with multiple grooves at a predetermined interval.

The housing member 12 may accommodate the prisms 14a to 14c, the grating 14d, and the holders 16a to 16d. In the housing member 12, the prism 14a may be supported by the holder 16a, the prism 14b may be supported by the holder 16b, the prism 14c may be supported by the holder 16c, and the grating 14d may be supported by the holder 16d. The holder 16c supporting the prism 14c may be rotatable in the HZ plane by a rotating stage 16e.

The housing member 12 may be supported by the plate 20a. The housing member 12 may have a through-hole 12a. A position of the through-hole 12a of the housing member 12 and a position of the through-hole 22a of the plate 20a may overlap each other as viewed in the Z direction. The interior of the optical path tube 21a and the interior of the housing member 12 may thus communicate with each other. An inert gas intake pipe 12c may be connected to the housing member 12 at a position distanced from the through-hole 12a. An inert gas exhaust pipe 21c may be connected to the optical path tube 21a at a position distanced from the through-hole 22a. An inert gas as a purge gas may be introduced via the inert gas intake pipe 12c to the housing member 12, and exhausted from the optical path tube 21a via the inert gas exhaust pipe 21c.

2.1.3 Output Coupling Mirror

The output coupling mirror 15 may be provided in a housing member 13. The output coupling mirror 15 may be supported in the housing member 13 by a holder 17. A surface of the output coupling mirror 15 may be coated with a partially reflective film.

The housing member 13 may be supported by the plate 20b. The housing member 13 may have a through-hole 13a. The position of the through-hole 13a of the housing member 13 and the position of the through-hole 22b of the plate 20b may overlap each other as viewed in the Z direction. The interior of the optical path tube 21b and the interior of the housing member 13 may thus communicate with each other. An unillustrated inert gas intake pipe may be connected to the optical path tube 21b and an unillustrated inert gas exhaust pipe may be connected to the housing member 13. An inert gas as a purge gas may be introduced to the optical path tube 21b and the housing member 13.

2.2 Operation

The high voltage applied between the pair of discharge electrodes 11a and 11b may cause an electric discharge between the pair of discharge electrodes 11a and 11b. Energy generated by the electric discharge may excite the laser medium in the laser chamber 10 to cause the laser medium to shift to a high energy level. The laser medium thus excited may then shift back to a low energy level to generate light having a wavelength according to the difference in the energy levels.

The light generated in the laser chamber 10 may be emitted from the laser chamber 10 via the windows 10a and 10b. A beam width of the light emitted from the laser chamber 10 via the window 10a may be expanded in the H direction by the prisms 14a to 14c. The light may then be incident on the grating 14d.

The light incident on the grating 14d from the prisms 14a to 14c may be reflected by the multiple grooves of the grating 14d to be diffracted in directions according to wavelengths of the light. The grating 14d may be positioned in a Littrow arrangement such that the incident angle of the light incident on the grating 14d from the prisms 14a to 14c and the diffracting angle of the diffracted light having a desired wavelength coincide with each other. The light having the desired wavelength and its vicinity may be returned via the prisms 14a to 14c to the laser chamber 10.

The prisms 14a to 14c may reduce the beam width of the light, diffracted from the grating 14d, in the H direction. The prisms 14a to 14c may introduce the light to the window 10a and to an electric discharge space of the laser chamber 10.

The output coupling mirror 15 may transmit and output a part of the light emitted from the window 10b of the laser chamber 10, and reflect and return another part of the light to the laser chamber 10.

The light emitted from the laser chamber 10 may reciprocate between the line narrow module 14 and the output coupling mirror 15. The light may thus be amplified each time it passes through the electric discharge space between the discharge electrodes 11a and 11b to cause laser oscillation. The light may be narrow-banded each time it is returned by the line narrow module 14. Further, a polarized light component polarized in the H direction may be selected by the above-described arrangement of the windows 10a and 10b and the films on the prisms 14a to 14c. The light thus amplified may be outputted from the output coupling mirror 15 as the laser beam. The laser beam may have a wavelength in a vacuum ultraviolet region. The laser beam may have a wavelength of approximately 193.4 nm.

2.3 Problem

The inert gas as the purge gas introduced to the optical path tube 21a and the housing member 12 may be nitrogen gas. Using the nitrogen gas may reduce procurement costs of the purge gas as compared to using helium gas. However, change in refractive index of the nitrogen gas with change in temperature may be greater than that of the helium gas. Temperature of the surface of the grating 14d may rise due to energy of the light. This may cause significant unevenness in the refractive index of the nitrogen gas in the vicinity of the surface of the grating 14d. Such unevenness in the refractive index may deform a wavefront of the light diffracted by the grating 14d. This may expand the wavelength bandwidth of the light selected by the line narrow module 14 to expand the spectral line width of the laser beam outputted from the laser device.

3. Laser Device Including Second Beam-Expanding Optics Expanding Beam in Direction Substantially Parallel to Direction of Discharge

3.1 Configuration

Figure 2A:
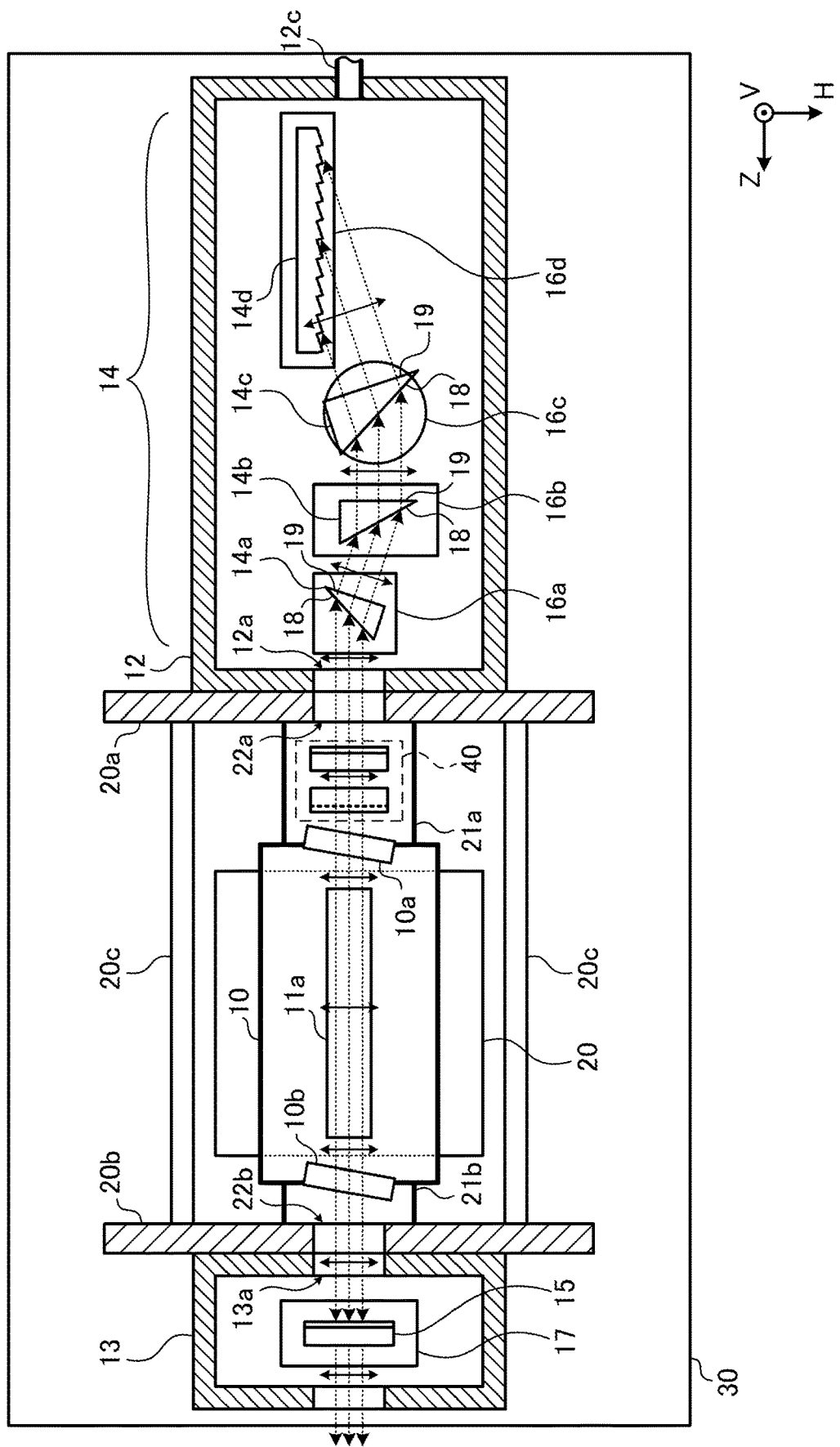
FIG. 2A schematically shows a configuration of a laser device according to a first embodiment.
Figure 2B:
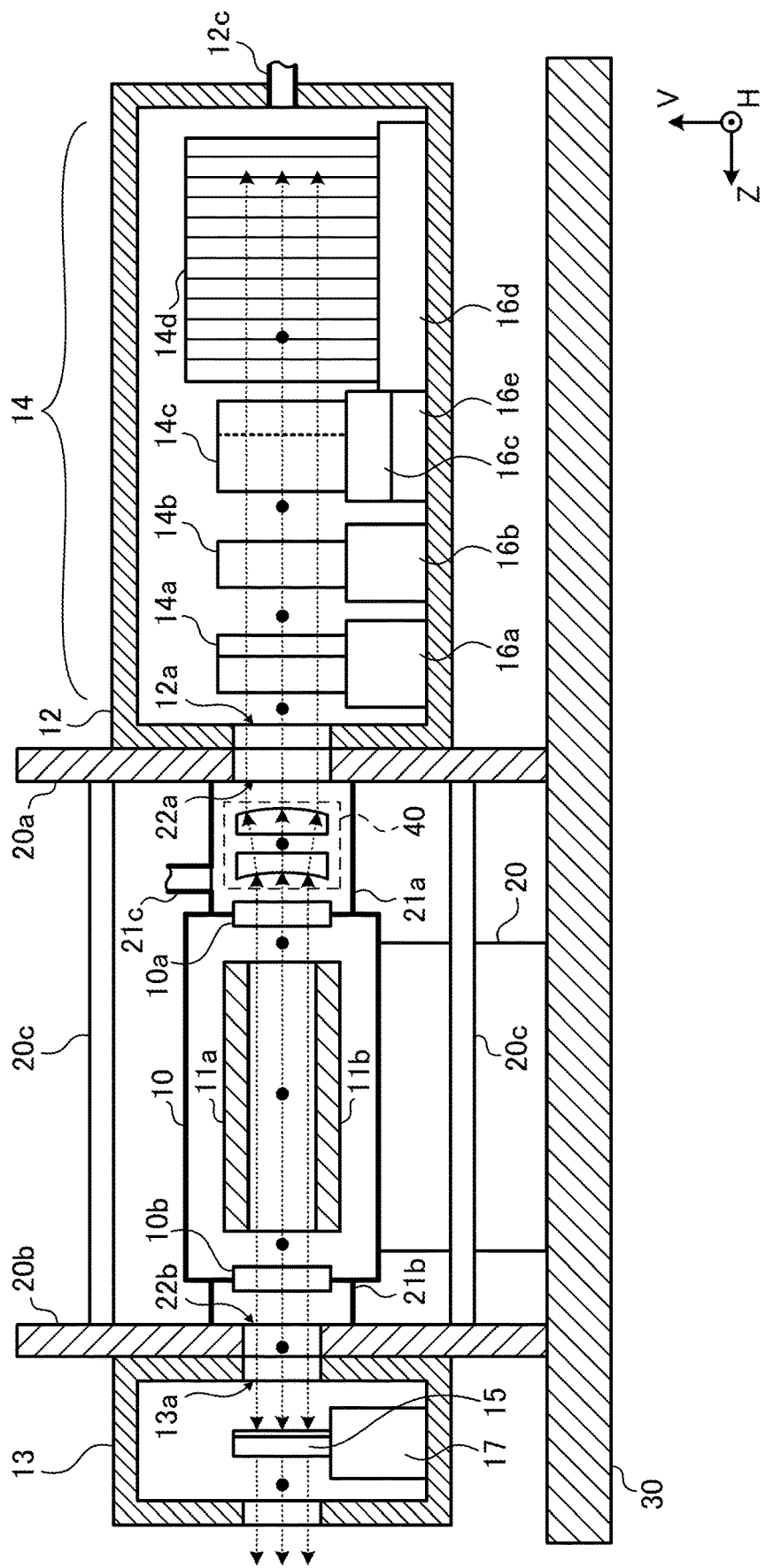
FIG. 2B schematically shows the configuration of the laser device according to the first embodiment.

FIGS. 2A and 2B schematically show a configuration of a laser device according to a first embodiment. The laser device according to the first embodiment may include second beam-expanding optics 40 to expand the beam in a direction substantially parallel to the direction of discharge. In this aspect, the first embodiment may be different from the comparative example explained with reference to FIGS. 1A and 1B. In the other aspects, the first embodiment may be substantially the same as the comparative example explained with reference to FIGS. 1A and 1B.

The second beam-expanding optics 40 to expand the beam in the direction substantially parallel to the direction of discharge may be provided in the optical path between the window 10a and the grating 14d. Here, the direction substantially parallel to the direction of discharge may be the V direction.

The V direction may correspond to a second direction in the present disclosure.

An expansion ratio My of the beam width in the V direction by the second beam-expanding optics 40 may be 1.1 or more and 5 or less. The expansion ratio My of the beam width in the V direction by the second beam-expanding optics 40 may preferably be lower than an expansion ratio Mh of the beam width in the H direction by the three prisms 14a to 14c.

The H direction may correspond to a first direction in the present disclosure. The prisms 14a to 14c may correspond to first beam-expanding optics in the present disclosure.

The second beam-expanding optics 40, the prisms 14a to 14c, and the grating 14d may constitute line narrow optics in the present disclosure.

The second beam-expanding optics 40 may be provided in the optical path tube 21a. The second beam-expanding optics 40 may be provided in the optical path between the window 10a and the prism 14a, which is the nearest to the window 10a. Namely, the prisms 14a to 14c may all be arranged between the second beam-expanding optics 40 and the grating 14d. The second beam-expanding optics 40 may thus be arranged in the position where the light outputted from the window 10a is not yet expanded by the prism 14a and the beam width is small. This may allow small-sized second beam-expanding optics 40 to be used.

Alternatively, the second beam-expanding optics 40 may be arranged in the optical path between the prism 14a, which is the nearest to the window 10a, and the prism 14b, which is the second nearest to the window 10a. The second beam-expanding optics 40 arranged in the optical path of the light expanded by the prism 14a may suppress increase in temperature of the second beam-expanding optics 40, and suppress deterioration of the second beam-expanding optics 40 due to the increase in temperature. The second beam-expanding optics 40 may thus be arranged in the position where the light is not yet expanded by the prism 14b. This may still allow small-sized second beam-expanding optics 40 to be used.

The second beam-expanding optics 40 may be arranged in the optical path between the prism 14b and the prism 14c. The second beam-expanding optics 40 may be arranged in the optical path between the prism 14c and the grating 14d.

3.2 Effect

The light in which the beam width is expanded by the second beam-expanding optics 40 in the V direction may be incident on the grating 14d. According to the first embodiment, energy density of the light incident on the grating 14d may be reduced, and the increase in surface temperature of the grating 14d may be suppressed. This may reduce the unevenness in the refractive index of the inert gas at the periphery of the surface of the grating 14d as compared to the situation where the beam width is not expanded in the V direction. Deformation of the wavefront of the light diffracted by the grating 14d may thus be suppressed even if the nitrogen gas is used as the inert gas in the housing member 12 accommodating the grating 14d. This may suppress expanding the spectral line width of the laser beam outputted from the laser device.

Further, the energy density of the light incident on the diffracting surface of the grating 14d may be reduced to suppress deterioration of the diffracting surface of the grating 14d. As a result, reduction of diffraction efficiency of the grating 14d may be moderated, and lifetime of the grating may be increased.

4. Variation of Second Beam-Expanding Optics

4.1 Combination of Cylindrical Concave Lens and Cylindrical Convex Lens

Figure 3A:
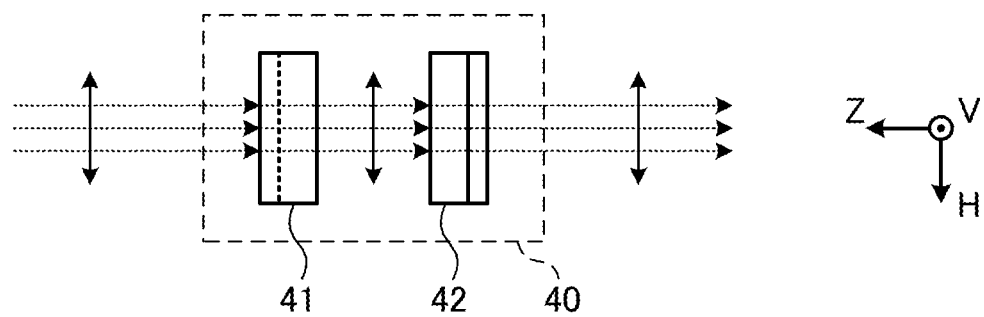
FIG. 3A shows an example of second beam-expanding optics used in the first embodiment.
Figure 3B:
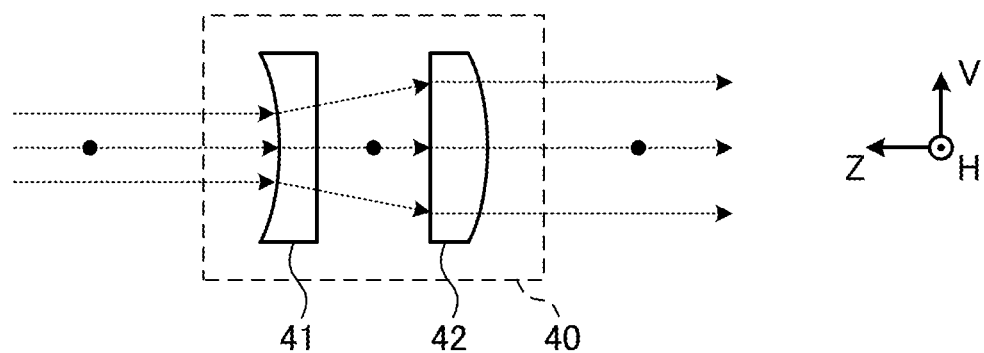
FIG. 3B shows the example of the second beam-expanding optics used in the first embodiment.

FIGS. 3A and 3B show an example of the second beam-expanding optics used in the first embodiment. The second beam-expanding optics 40 used in the first embodiment may include a cylindrical concave lens 41 and a cylindrical convex lens 42. The cylindrical concave lens 41 may be arranged in a position near the window 10a, and the cylindrical convex lens 42 may be arranged in a position distanced from the window 10a. Each surface of the cylindrical concave lens 41 and the cylindrical convex lens 42 may be coated with a film to suppress reflection of light.

The cylindrical concave lens 41 may have a cylindrical concave surface. At least a part of a contour of a cross section, perpendicular to the H direction, of the cylindrical concave lens 41 may be arcuate. The cylindrical convex lens 42 may have a cylindrical convex surface. At least a part of a contour of a cross section, perpendicular to the H direction, of the cylindrical convex lens 42 may be arcuate. Here, the rear side focal axis of the cylindrical concave lens 41 and the front side focal axis of the cylindrical convex lens 42 may substantially coincide with each other.

Alternatively, at least a part of the contour of the cross section, perpendicular to the H direction, of the cylindrical concave lens 41 may be non-arcuate to suppress deformation of the wavefront. At least a part of the contour of the cross section, perpendicular to the H direction, of the cylindrical convex lens 42 may be non-arcuate to suppress deformation of the wavefront.

The second beam-expanding optics 40 shown in FIGS. 3A and 3B may expand the beam width in the V direction without shifting the beam axis. The second beam-expanding optics 40 may not necessarily expand the beam width in the H direction. Difference between the function of the second beam-expanding optics 40 expanding the beam width in the V direction and the function of the prisms 14a to 14c expanding the beam width in the H direction may thus be clear, and the optics may be designed simply.

4.2 Prisms

Figure 4A:
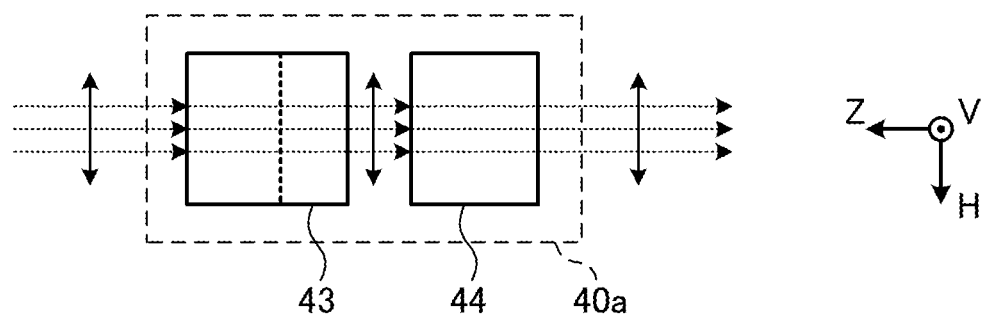
FIG. 4A shows an example of second beam-expanding optics used in a second embodiment.
Figure 4B:
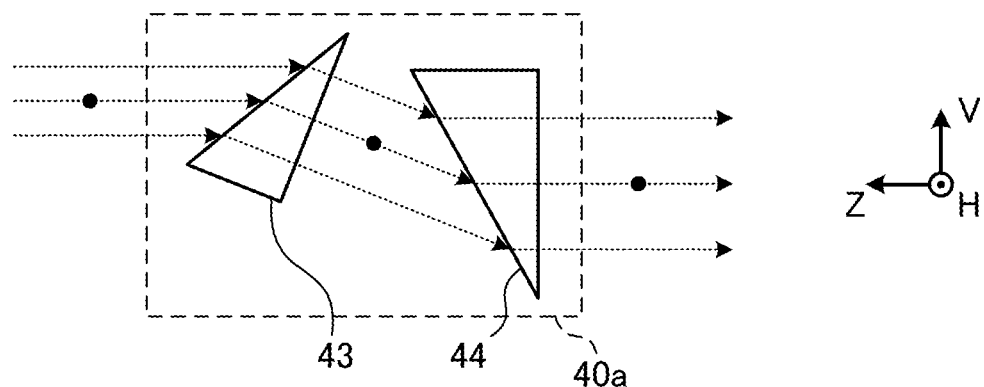
FIG. 4B shows the example of the second beam-expanding optics used in the second embodiment.

FIGS. 4A and 4B show an example of second beam-expanding optics used in a second embodiment. The second beam-expanding optics 40a used in the second embodiment may include a plurality of prisms 43 and 44.

Each surface of the prisms 43 and 44 may be coated with a film to reduce reflection of s-polarized light. The prisms 43 and 44 may thus suppress the reflection of a polarized light component polarized in the H direction. The prisms 43 and 44 may transmit the polarized light component polarized in the H direction at high transmittance.

The second beam-expanding optics 40a shown in FIGS. 4A and 4B may expand the beam width in the V direction while suppressing the deformation of the wavefront. Further, a space for installation of the second beam-expanding optics may be suppressed. The second beam-expanding optics 40a may not necessarily expand the beam width in the H direction. Difference between the function of the second beam-expanding optics 40a expanding the beam width in the V direction and the function of the prisms 14a to 14c expanding the beam width in the H direction may thus be clear, and the optics may be designed simply.

The second beam-expanding optics 40a may shift, in the V direction, the optical path axis extending from the second beam-expanding optics 40a toward the grating, as compared to the optical path axis extending from the second beam-expanding optics 40a toward the chamber. However, the optical path axis extending from the second beam-expanding optics 40a toward the grating may be substantially parallel to the optical path axis extending from the second beam-expanding optics 40a toward the chamber. Here, an acceptable range for an angle between these optical path axes may preferably be ±1°, and more preferably ±0.5°. If the optical path axis between the laser chamber 10 and the second beam-expanding optics 40a is perpendicular to the direction of gravity, the optical path axis between the second beam-expanding optics 40a and the grating 14d may also be perpendicular to the direction of gravity. Even when the second beam-expanding optics 40a are used, the prisms 14a to 14c and the grating 14d may not necessarily be inclined relative to the direction of gravity, and reduction in freedom of design may be moderated.

Each of the prisms 43 and 44 constituting the second beam-expanding optics 40a may be made of $CaF_2$ crystal. A vertex angle of the prism 43 and a vertex angle of the prism 44 may be 33° or more and 34° or less. The incident angle of the light incident on the slant face of the prism 43 and the incident angle of the light incident on the slant face of the prism 44 may be 44° or more and 67° or less. The incident angle within this range, with the films on the prisms 43 and 44 to reduce the reflection of the s-polarized light, may suppress reflectance for the s-polarized light to 1% or less.

4.3 Combination of Spherical Concave Lens and Spherical Convex Lens

Figure 5A:
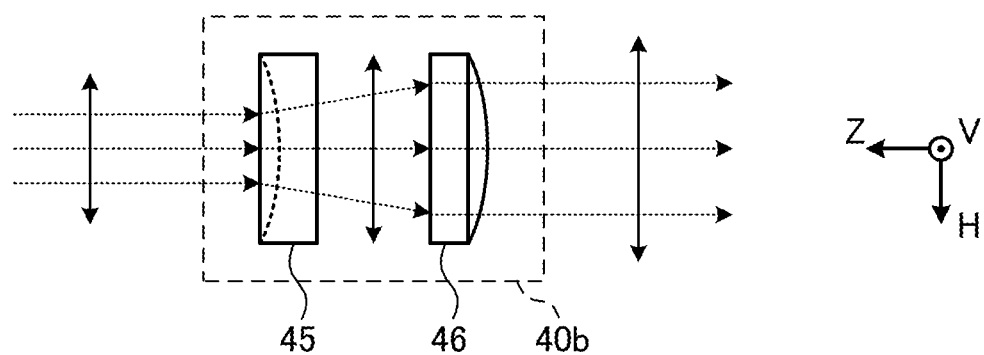
FIG. 5A shows an example of second beam-expanding optics used in a third embodiment.
Figure 5B:
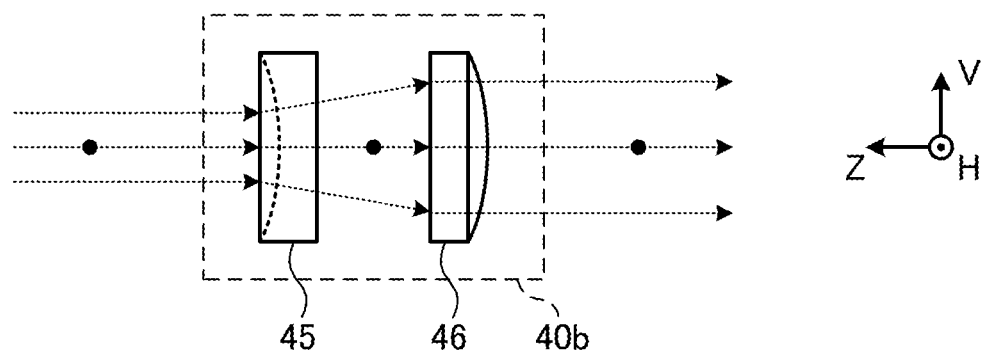
FIG. 5B shows the example of the second beam-expanding optics used in the third embodiment.

FIGS. 5A and 5B show an example of second beam-expanding optics used in a third embodiment. The second beam-expanding optics 40b used in the third embodiment may include a spherical concave lens 45 and a spherical convex lens 46. The spherical concave lens 45 may be arranged in a position near the window 10a, and the spherical convex lens 46 may be arranged in a position distanced from the window 10a. Each surface of the spherical concave lens 45 and the spherical convex lens 46 may be coated with a film to suppress reflection of light. Here, the rear side focal point of the spherical concave lens 45 and the front side focal point of the spherical convex lens 46 may substantially coincide with each other.

Alternatively, in place of the spherical concave lens 45, an aspherical concave lens may be used to suppress deformation of the wavefront. In place of the spherical convex lens 46, an aspherical convex lens may be used to suppress deformation of the wavefront.

The second beam-expanding optics 40b shown in FIGS. 5A and 5B may expand the beam width in the V direction and the beam width in the H direction at substantially the same expansion ratios. Using the second beam-expanding optics 40b may allow some of the three prisms 14a to 14c to be omitted.

5. Supporting Structure for Second Beam-Expanding Optics 5.1 First Example

Figure 6A:
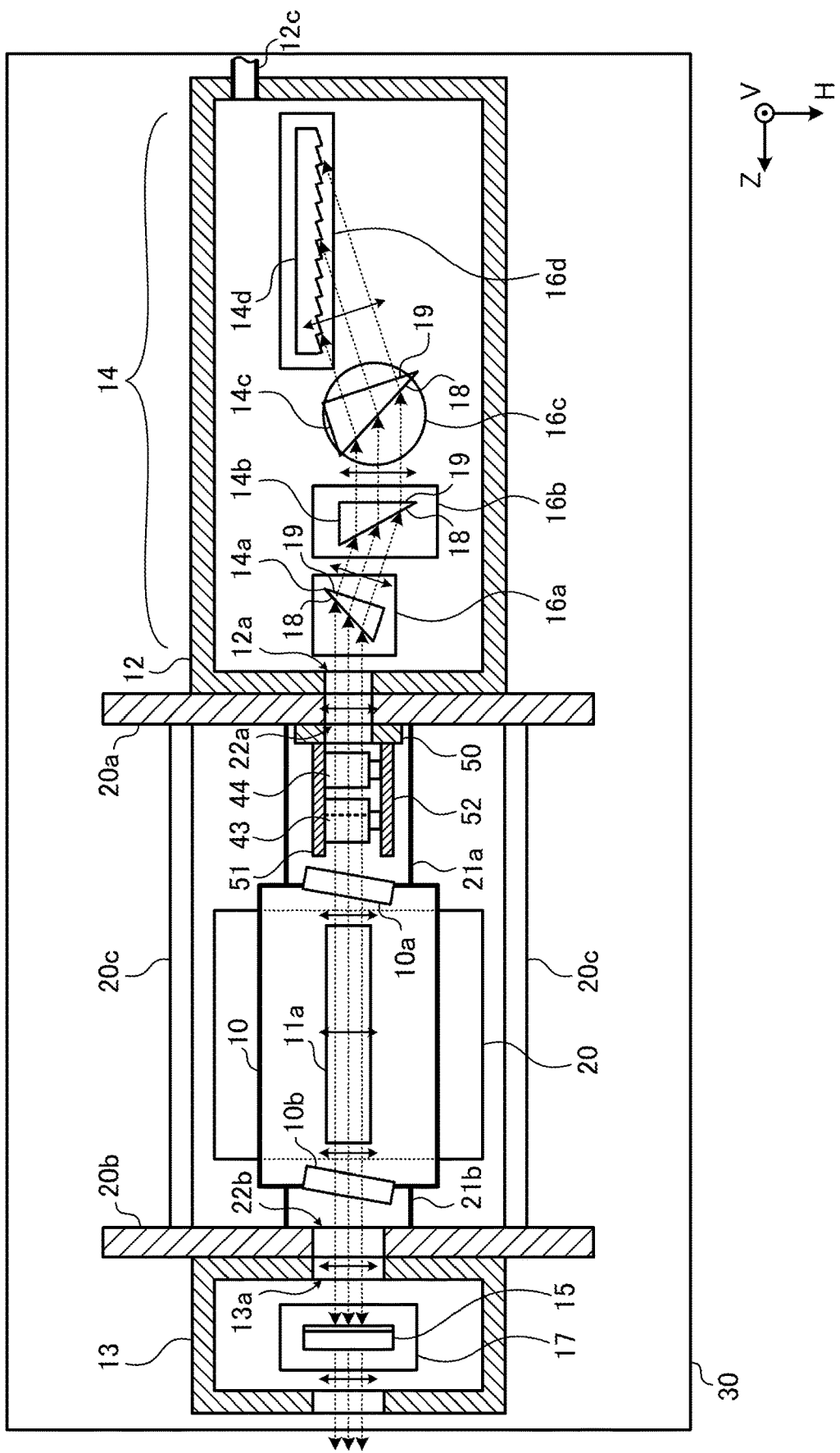
FIG. 6A schematically shows a configuration of a laser device according to a fourth embodiment.
Figure 6B:
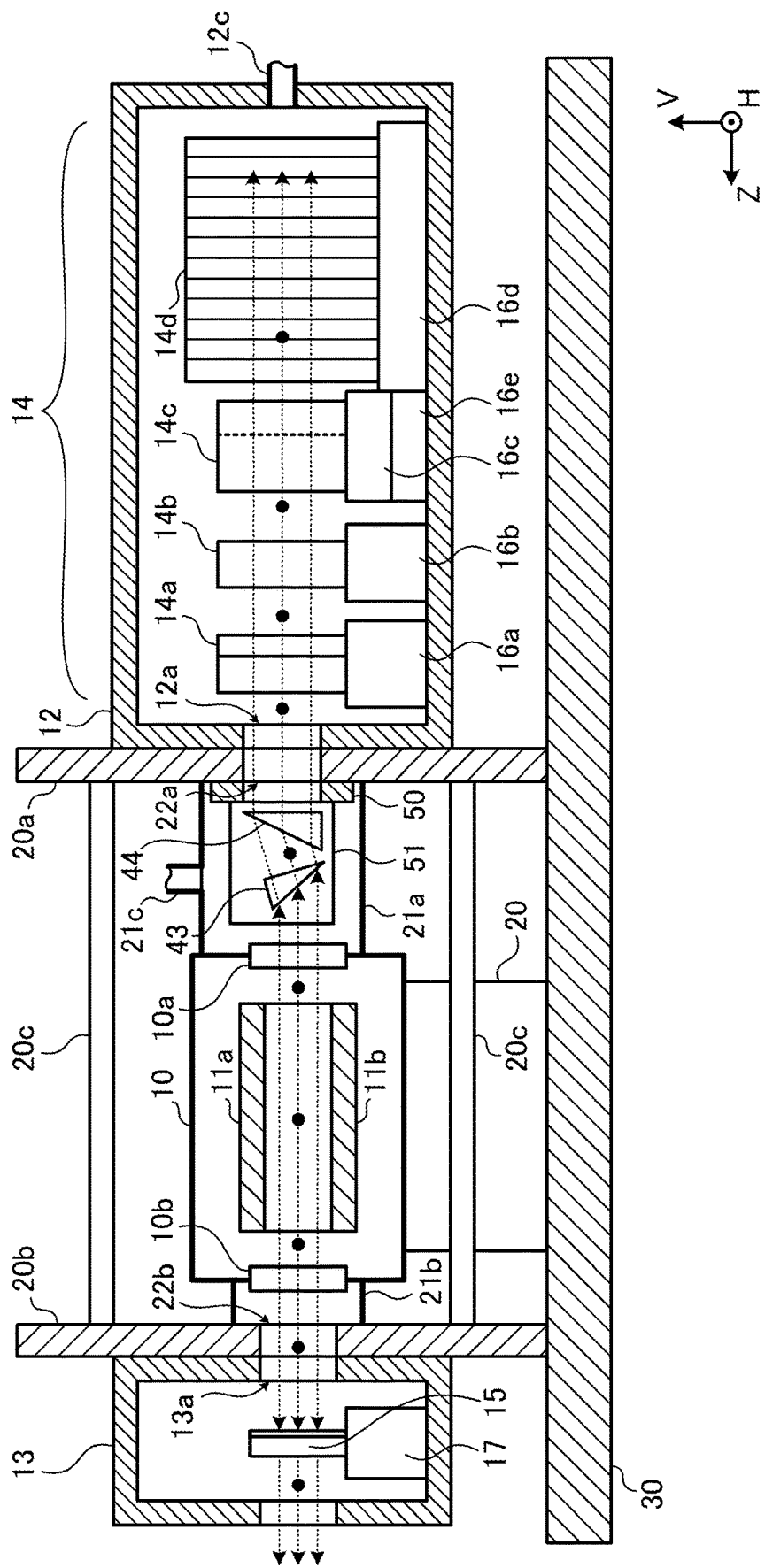
FIG. 6B schematically shows the configuration of the laser device according to the fourth embodiment.

FIGS. 6A and 6B schematically show a configuration of a laser device according to a fourth embodiment. The fourth embodiment shows a first example of a supporting structure for the prisms 43 and 44 in the second embodiment explained with reference to FIGS. 4A and 4B.

As shown in FIGS. 6A and 6B, the prisms 43 and 44 may be supported between a first member 51 and a second member 52. The first member 51 and the second member 52 are plates constituting a pair.

The first member 51 and the second member 52 may each have a surface parallel to a VZ plane. The first member 51 and the second member 52 may be arranged such that these surfaces parallel to the VZ plane may face each other.

The first member 51 and the second member 52 may be fixed to a supporting plate 50 while the first member 51 and the second member 52 support the prisms 43 and 44 as a single unit and are fixed to each other. The supporting plate 50 may be fixed to the plate 20a with unillustrated bolts. While the first member 51 and the second member 52 support the prisms 43 and 44 as a single unit, the above-described bolts may be loosen to allow the supporting plate 50 to be detached from the plate 20a, thereby the prisms 43 and 44 may be removed from the plate 20a.

According to this configuration, the prisms 43 and 44 may be supported as a single unit by the first member 51 and the second member 52. This allows the prisms 43 and 44, in conjunction with each other, to be attached to and detached from the laser device. Further, the prisms 43 and 44 may be compatibly installed in a laser device that has been used without the prisms 43 and 44 in a semiconductor manufacturing factory.

The plate 20a may support the first member 51 and the second member 52, and the first member 51 and the second member 52 may support the prisms 43 and 44. This may suppress increasing the weight of the housing member 12 accommodating the prisms 14a to 14c and the grating 14d.

5.2 Second Example

Figure 7A:
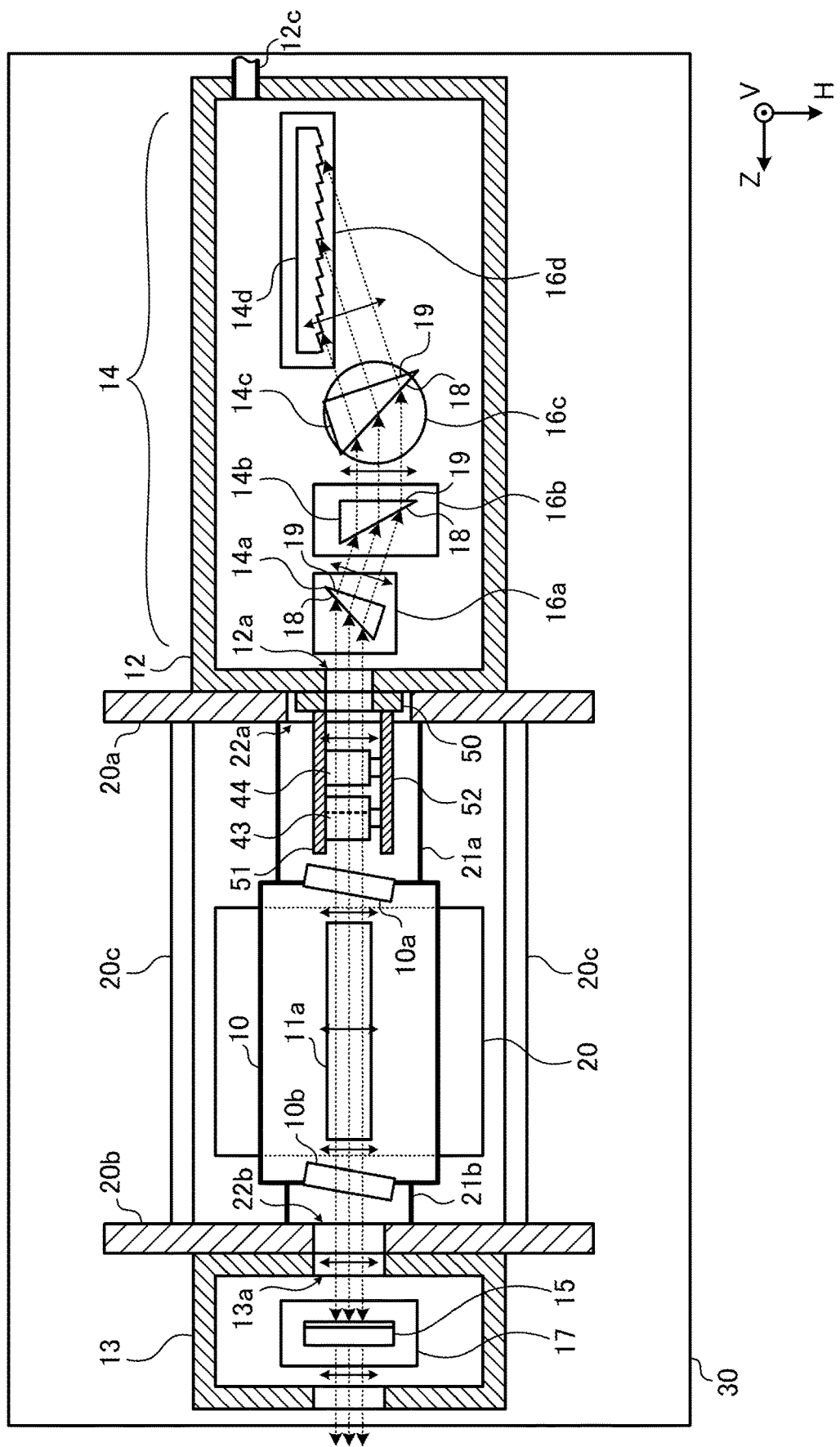
FIG. 7A schematically shows a configuration of a laser device according to a fifth embodiment.
Figure 7B:
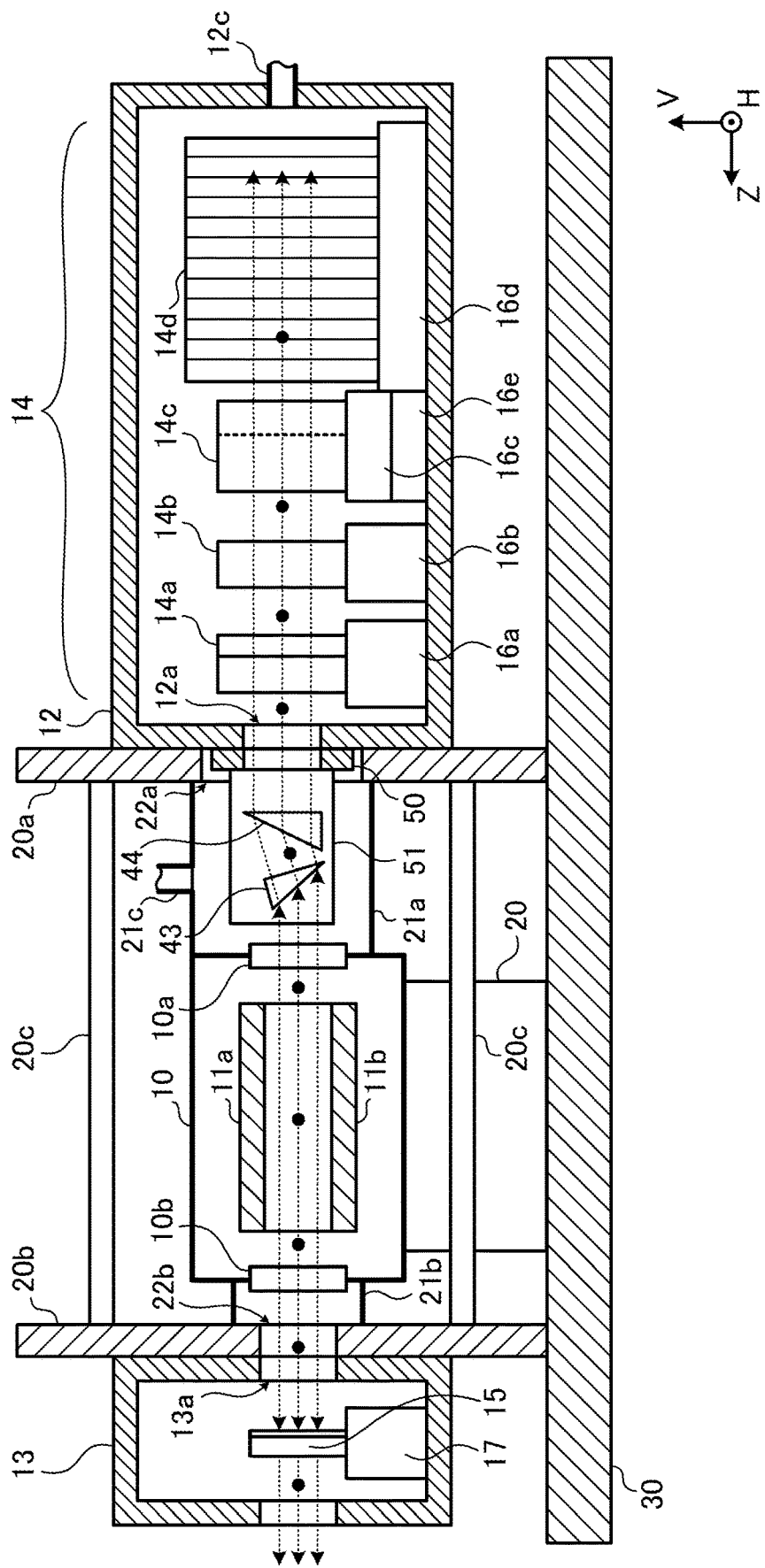
FIG. 7B schematically shows the configuration of the laser device according to the fifth embodiment.

FIGS. 7A and 7B schematically show a configuration of a laser device according to a fifth embodiment. The fifth embodiment shows a second example of the supporting structure for the prisms 43 and 44 in the second embodiment explained with reference to FIGS. 4A and 4B.

In the second example, the through-hole 22a of the plate 20a may be larger than the through-hole 12a of the housing member 12. The supporting plate 50 may be in the through-hole 22a of the plate 20a. The supporting plate 50 may be fixed to the housing member 12 with unillustrated bolts. The prisms 43 and 44, the first member 51, the second member 52, and the supporting plate 50, each supported by the housing member 12, may thus be supported by the plate 20a. The above-described bolts may be loosened to allow the supporting plate 50 to be detached from the housing member 12, thereby the prisms 43 and 44 may be removed from the housing member 12.

In the other aspects, the second example may be substantially the same as the first example explained with reference to FIGS. 6A and 6B.

5.3 Configuration of Supporting Unit

Figure 8A:
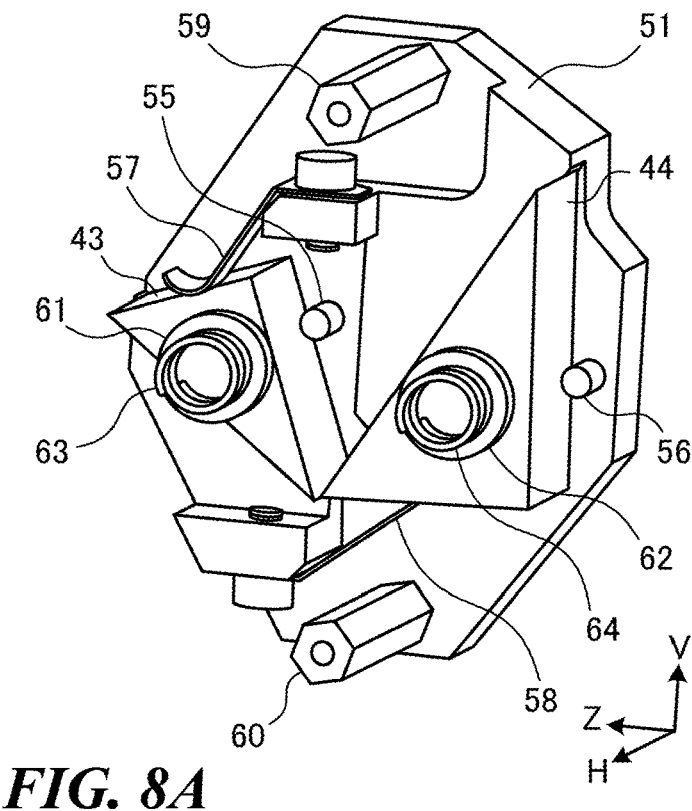
FIG. 8A shows an example of second beam-expanding optics including a supporting unit and used in a fourth or fifth embodiment.
Figure 8B:
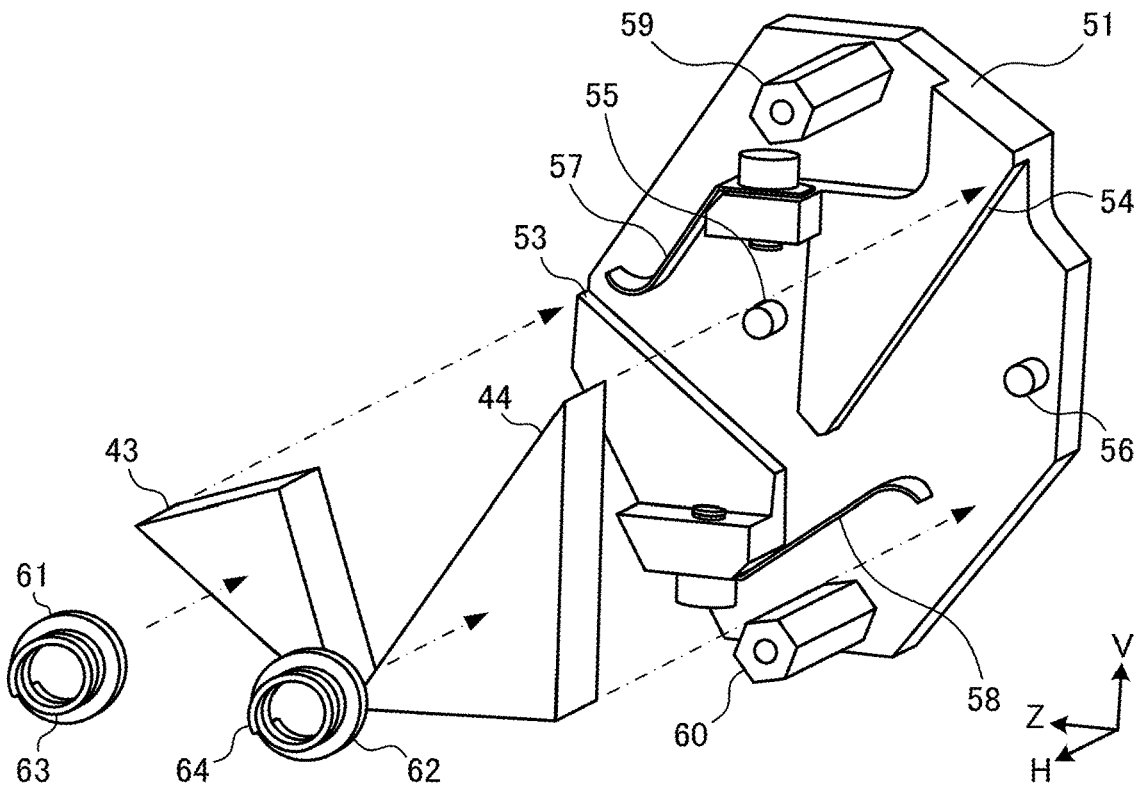
FIG. 8B is an exploded perspective view of the second beam-expanding optics shown in FIG. 8A.

FIG. 8A shows an example of the second beam-expanding optics including a supporting unit and used in the fourth or fifth embodiment. FIG. 8B is an exploded perspective view of the second beam-expanding optics shown in FIG. 8A.

The first member 51 constituting a supporting unit supporting the prisms 43 and 44 may have step portions 53 and 54. The first member 51 may also have projecting portions 55 and 56. Leaf springs 57 and 58 may be attached to the first member 51.

The prism 43 may be pressed against the first member 51 by a pressing plate 61 and a pressing spring 63. One rectangular face of the prism 43 may contact the step portion 53, and another rectangular face of the prism 43 may contact the projecting portion 55. Thus, the step portion 53 may define the posture of the prism 43. The step portion 53 and the projecting portion 55 may define the position of the prism 43. The leaf spring 57 may press the prism 43 from the upper side in the figure to fix the prism 43 at a predetermined position against the first member 51.

The prism 44 may be pressed against the first member 51 by a pressing plate 62 and a pressing spring 64. One rectangular face of the prism 44 may contact the step portion 54, and another rectangular face of the prism 44 may contact the projecting portion 56. Thus, the step portion 54 may define the posture of the prism 44. The step portion 54 and the projecting portion 56 may define the position of the prism 44. The leaf spring 58 may press the prism 44 from the lower side in the figure to fix the prism 44 at a predetermined position against the first member 51.

The second member 52 shown in each of FIGS. 6A and 7A may be fixed to gap-adjusting rods 59 and 60 at a predetermined gap against the first member 51. The second member 52 may press the prisms 43 and 44 with the respective pressing springs 63 and 64 against the first member 51.

According to this configuration, the prisms 43 and 44 may be supported as a single unit at a compact configuration.

6. Others

In the above-described embodiments, the beam-expanding optics may be transmitting type optics. However, reflecting type optics such as mirrors may be used.

The aforementioned descriptions are intended to be taken only as examples, and are not to be seen as limiting in any way. Accordingly, it will be clear to those skilled in the art that variations on the embodiments of the present disclosure can be made without departing from the scope of the appended claims.

The terms used in the present specification and in the entirety of the scope of the appended claims are to be interpreted as not being limiting. For example, wording such as "includes" or "is included" should be interpreted as not being limited to the item that is described as being included. Furthermore, "has" should be interpreted as not being limited to the item that is described as being had. Furthermore, the modifier "a" or "an" as used in the present specification and the scope of the appended claims should be interpreted as meaning "at least one" or "one or more".

The invention claimed is:

1. A laser device comprising:
    a chamber accommodating a pair of discharge electrodes;
    a grating provided outside the chamber;
    a first beam-expanding optics provided between the chamber and the grating and configured to expand a beam width of light outputted from the chamber in a first direction perpendicular to a travelling direction of the light;
    a second beam-expanding optics having a plurality of optical elements provided between the chamber and the first beam-expanding optics, the second beam-expanding optics being configured to expand a beam width of the light outputted from the chamber in a second direction perpendicular to both the travelling direction of the light and the first direction, the optical elements being supported as a single unit by a supporting unit such that the optical elements are capable of, in conjunction with each other, being attached to and detached from the chamber, the grating, and the first beam-expanding optics; and
    a housing member accommodating the first beam-expanding optics, wherein nitrogen gas is introduced to the housing member as a purge gas.

2. The laser device according to claim 1, further comprising:
    a plate supporting the housing member; and
    an optical path tube connected airtight between the plate and the chamber.

3. The laser device according to claim 2, wherein the second beam-expanding optics is provided in the optical path tube.

4. The laser device according to claim 2, wherein the plate has a through-hole and an end of the optical path tube is fixed airtight to a periphery of the through-hole.

5. The laser device according to claim 4, wherein the housing member has a through-hole and a position of the through-hole of the housing member and a position of the through-hole of the plate overlap each other as viewed in the travelling direction of the light.

6. The laser device according to claim 1, wherein
    the optical elements include a first and second prisms,
    each of the first and second prisms is made of $CaF_2$ crystal,
    a vertex angle of each of the first and second prisms is 33° or more and 34° or less, and
    an incident angle of the light incident on a slant face of each of the first and second prisms is 44° or more and 67° or less.

* * * * *